US009189394B2

(12) United States Patent
Kim (10) Patent No.: US 9,189,394 B2
(45) Date of Patent: Nov. 17, 2015

(54) MEMORY-LINK COMPRESSION FOR GRAPHIC PROCESSOR UNIT

(75) Inventor: Nam Sung Kim, Middleton, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 674 days.

(21) Appl. No.: 13/569,999

(22) Filed: Aug. 8, 2012

(65) Prior Publication Data

US 2014/0047199 A1 Feb. 13, 2014

(51) Int. Cl.
*G06F 12/00* (2006.01)
*G06F 12/04* (2006.01)
*H04N 19/176* (2014.01)
*G06F 12/08* (2006.01)

(52) U.S. Cl.
CPC ............. *G06F 12/04* (2013.01); *G06F 12/08* (2013.01); *H04N 19/176* (2014.11)

(58) Field of Classification Search
None
See application file for complete search history.

(56) References Cited

U.S. PATENT DOCUMENTS

| | | | | |
|---|---|---|---|---|
| 5,708,511 A | * | 1/1998 | Gandhi et al. | 382/239 |
| 6,795,897 B2 | * | 9/2004 | Benveniste et al. | 711/118 |
| 8,243,086 B1 | * | 8/2012 | Diard | 345/555 |
| 2003/0217237 A1 | * | 11/2003 | Benveniste et al. | 711/153 |
| 2009/0160857 A1 | | 6/2009 | Rasmusson et al. | |
| 2010/0013839 A1 | | 1/2010 | Rawson | |
| 2010/0114909 A1 | * | 5/2010 | Museth | 707/748 |
| 2012/0320067 A1 | * | 12/2012 | Iourcha et al. | 345/501 |
| 2013/0088504 A1 | * | 4/2013 | Strom et al. | 345/582 |
| 2013/0262809 A1 | * | 10/2013 | Wegener | 711/165 |
| 2014/0101485 A1 | * | 4/2014 | Wegener | 714/32 |
| 2015/0025819 A1 | * | 1/2015 | Chandra et al. | 702/58 |

OTHER PUBLICATIONS

'High Quality DXT Compression using CUDA' by Ignacio Castano, nVIDIA, Feb. 2007.*
'Parallel Variable-Length Encoding on GPGPUs' by Balevic, Euro-Par 2009—Parallel Processing Workshops Lecture Notes in Computer Science vol. 6043, 2010, pp. 26-35.*

* cited by examiner

*Primary Examiner* — Steven Snyder
(74) *Attorney, Agent, or Firm* — Boyle Fredrickson, S.C.

(57) ABSTRACT

A graphic processing unit having multiple computational elements flexibly interconnected to memory elements provides for data compressors/decompressors in the memory channels communicating between the computational elements and memory elements to provide an effective increase in bandwidth of those connections by the compression of data transferred thereon.

17 Claims, 7 Drawing Sheets

MEMORY-LINK COMPRESSION FOR GRAPHIC PROCESSOR UNIT

STATEMENT REGARDING FEDERALLY SPONSORED RESEARCH OR DEVELOPMENT

This invention was made with government support under 0953603 awarded by the National Science Foundation. The government has certain rights in the invention.

CROSS REFERENCE TO RELATED APPLICATION

--

BACKGROUND OF THE INVENTION

The present invention relates to graphics processing units (GPUs) and in particular to a method of accelerating processing by such units by compressing data subject to transfer between GPUs and their off-chip memory.

GPUs) provide a computer architecture specialized for graphics processing but they may also work with a conventional computer processing unit (CPU) to accelerate highly-parallel general-purpose applications. In this regard, GPUs provide for a large number of computational elements that may operate in parallel on data held in special GPU memory.

In normal operation, the CPU prepares data to be operated on by the GPU and loads that data into the GPU memory together with information about the desired GPU functions to be performed. The multiple computational elements then execute the desired functions and the data is returned to the CPU memory from the GPU memory.

The normal problems of long latency related to access by the computational elements to off-chip memory can be readily accommodated in a GPU by flexibly switching the computational elements to a different thread (context switching) when a given thread is facing a memory access delay. Since such switching is "lightweight" in a GPU because the GPU has a large register file so that multiple "in-flight" threads do not need to move their data from the register file to a secondary memory. For this reason such switches between threads can be accomplished rapidly with little delay, making this an effective strategy for dealing with memory latency.

SUMMARY OF THE INVENTION

The inventor has recognized that context switching may be inadequate to prevent significant impact in the execution speed of the GPU caused by memory latency (waiting for memory accesses) in many important memory-bound applications, particularly when GPUs are used for general-purpose computation where the rate of memory access instructions to compute instructions increases significantly. To address this problem, the present invention provides compression/decompression of data passing between the computational elements and the GPU memory on a memory link. The present inventor has determined that compressing data on the memory link effectively increases the rate of data transfer despite the time delay inherent in doing the compression or decompression.

In one embodiment, the invention provides a GPU having a plurality of computational elements each adapted to execute instructions on input data to provide output data and having a plurality of memory elements inter-communicating with a first set of the computational elements through associated memory channels to provide input data thereto and receive output data therefrom. A compressor/decompressor associated with each memory channel between a memory element and a connected computational element decompresses data stored in the memory element for reading by the computational element and compresses data written by the computational element for storage in the memory element.

It is thus a feature of at least one embodiment of the invention to improve the execution of memory-bound programs by GPUs by increasing the effective bandwidth of memory channels.

The memory elements may reserve blocks of memory having a predetermined address size for the compressed data based on the uncompressed size of the compressed data.

It is thus a feature of at least one embodiment of the invention to avoid the circuitry overhead and delay associated with transferring irregular memory units.

The compressor/decompressor may be adapted to provide lossy compression and decompression.

It is thus a feature of at least one embodiment of the invention to provide a fast and simple compression technique consistent with high-speed memory transfer.

The lossy compression and decompression may truncate bits from data transferred from the computational element to the memory element. For example, the compression may truncate the least significant bits.

It is thus a feature of at least one embodiment of the invention to permit the use of a simple compression technique that yields consistent compression for simplified data handling.

The compressor/decompressor may further be adapted to provide a loss-less compression and decompression, and the compressor/decompressor may operate to selectively provide lossy or loss-less compression/decompression according to a compression mode signal.

It is thus a feature of at least one embodiment of the invention to permit compression of data where lossy compression would provide unacceptable loss of accuracy or produce execution errors.

The compression mode signal may be derived from a data type of the data received by the compressor/decompressor.

It is thus a feature of at least one embodiment of the invention to provide a simple method of controlling the application of lossy or loss-less compression, for example, by identifying the datatype in the memory transfer instruction.

The data type may include integer data and floating-point data and the compressor/decompressor may provide loss-less compression of integer data and lossy compression of floating-point data.

It is thus a feature of at least one embodiment of the invention to identify a simple proxy for the types of data that can be subject to lossy compression.

The memory elements may include blocks storing input data and output data and a compression table storing, for each block compression, data indicating whether the data of the block is compressed and the amount of compression, and the compressor/decompressor may use the compression data to determine an amount of data to read from the block being different from a size of the block.

It is thus a feature of at least one embodiment of the invention to provide a method to avoid the transferred data not necessary to the decompression.

The GPU may include at least one memory cache associated with each memory channel for caching a portion of the compression table.

It is thus a feature of at least one embodiment of the invention to accommodate the large size of the compression table without an on-chip memory system.

The compressor/decompressor may use compression data from the cache and, in the event of a cache miss, reads the entire data block while waiting for the cache miss to be resolved.

It is thus a feature of at least one embodiment of the invention to promote high-speed data transfer by avoiding a stalling of the data transfer when decompression information from the compression table is temporarily unavailable.

The compressor/decompressor may be implemented with a second set of the computational elements different from the first set.

It is thus a feature of at least one embodiment of the invention to permit the implementation of the present invention without substantial change to the GPU hardware.

The memory elements may be on a separate integrated circuit from an integrated circuit holding the computational units and the compressor/decompressor.

It is thus a feature of at least one embodiment of the invention to greatly increase memory transfer speeds for off chip memory.

These particular objects and advantages may apply to only some embodiments falling within the claims and thus do not define the scope of the invention.

DETAILED DESCRIPTION OF THE PREFERRED EMBODIMENT

Figure 1:
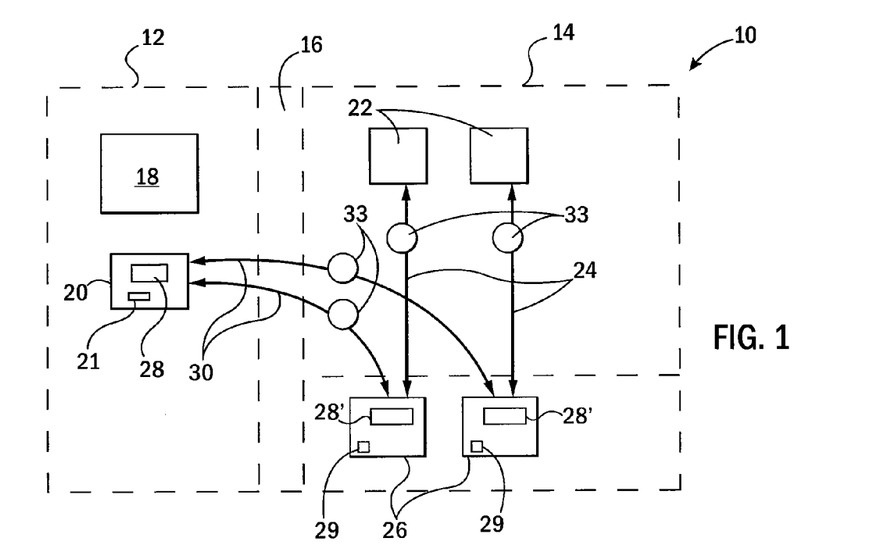
FIG. 1 is a simplified diagram of the data flow between a CPU system and a GPU system showing logical points of data compression and decompression.

Referring now to FIG. 1, the present invention may provide for a computer system 10 having a central processing unit (CPU) system 12 and a graphic processing unit (GPU) system 14 inter-communicating by a common bus 16. The CPU system 12 may have a processor 18 including one or more cores and a memory 20 including, for example, random access memory, disk drives, etc. As is generally understood in the art, the processor 18 will execute stored programs 21 from memory 20 reading data 28 from the memory 20 and writing data 28 to the memory 20 during this execution. The stored programs 21 may include an operating system as well as one or more application programs of the type known in the art including programs manipulating graphic images for display on an associated display (not shown).

The GPU system 14 may include multiple computational units 22 communicating over memory channels 24 with memory elements 26. Generally the memory elements 26 are located "off chip" meaning that they are distanced from the computational units 22 by constrained bandwidth connections (through a limited number of package pins or the like) as is necessary when a common integrated circuit substrate is not shared. The computational units 22 will also execute stored programs 29 held in memory elements 26 reading data 28 from memory elements 26 and writing data 28 to memory elements 26. The stored programs 29 may include a GPU operating system as well as instructions provided from the CPU system 12. The stored programs 29 may be augmented by firmware of the GPU system 14 as is generally understood in the art. The computational units 22 may be flexibly interconnected with the memory elements 26 through memory channels 24.

In accordance with one embodiment of the present invention, during operation of the computer system 10, data 28 in uncompressed form in memory 20, for example graphics data, will be transferred from the CPU system 12 to the memory elements 26 for processing by the GPU system 14 as indicated by dataflow arrows 30. In this embodiment, the data 28 will undergo a compression operation by one or more compressor/decompressors 33 to provide for a compressed form of the data 28' in the memory elements 26.

When required by computational units 22, the compressed data 28' is forwarded through compressor/decompressors 33 positioned on memory channels 24, to the computational units 22 to provide decompressed data 28 to the computational units 22. After the data 28 has been processed by the computational units 22, it is returned through memory channels 24 and through the compressor/decompressors 33 to recompress the data 28' for storage in a compressed form in memory elements 26.

This compression, by reducing the amount of data that needs to be transferred through the limited bandwidth memory channels 24 speeds the process of data transfer increasing the effective bandwidth of the memory channels 24.

Figure 2:
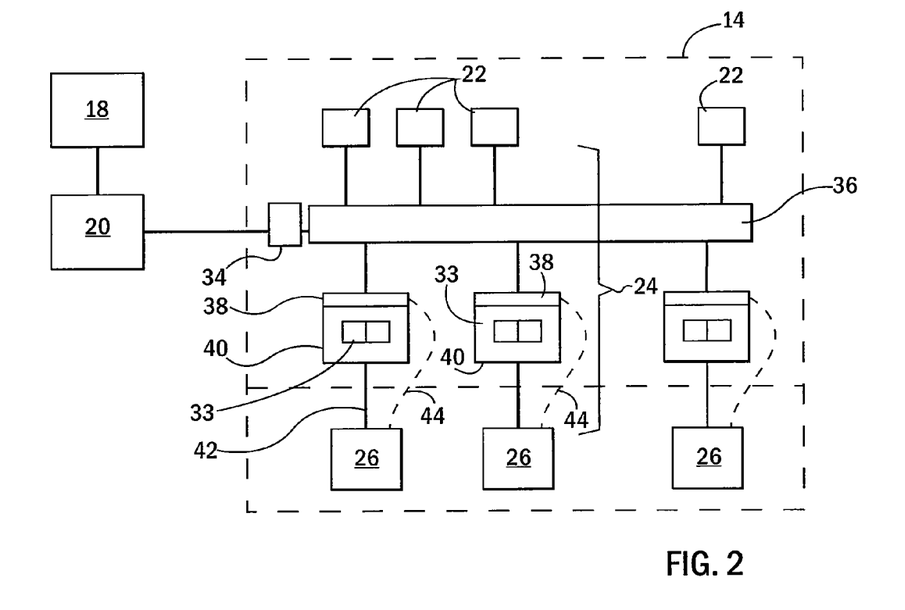
FIG. 2 is a block diagram of the CPU system and GPU system showing the principal functional elements implementing the compression and decompression of FIG. 1 including multiple processing units in memory elements and memory controllers communicating between the two and holding the compressor/decompressor.

Referring now to FIG. 2, in one embodiment, the GPU system 14 may include a direct memory access controller 34 of the type well known in the art to affect transfers of data 28 between memory 20 and memory elements 26. The direct memory access controller may communicate with a GPU interconnection system or router 36 forming a portion of the memory channels 24 and flexibly interconnecting different computational units 22 with different memory elements 26 as required during context switching and the like.

The router 36 connects each memory element 26 to an L1 cache 38 positioned typically on a chip with the computational unit 22 to provide standard cache functionality. The L1 cache in turn connects to a memory controller 40 (also typically on a chip) that provides for standard memory mapping functions as is understood in the art. Each memory controller 40 communicates in turn with a corresponding off chip memory element 26 through a limited bandwidth main memory channel 42. The main memory channel 42 may also implement a virtual memory channel 44 providing a high priority logical connection between memory element 26 and cache 38 for particular data as will be described below.

In one embodiment of the invention, each memory controller 40 may incorporate circuitry affecting a compressor/decompressor 33 serving to implement compression and decompression between memory elements 26 and the cache 38 as described above. Thus, the memory controller 40 may provide for the initial compression of data 28 transferred between memory 20 and memory element 26 and for the decompression and re-compression of the data 28' as transferred along memory channels 24 between computational unit 22 and memory elements 26.

Figure 3:
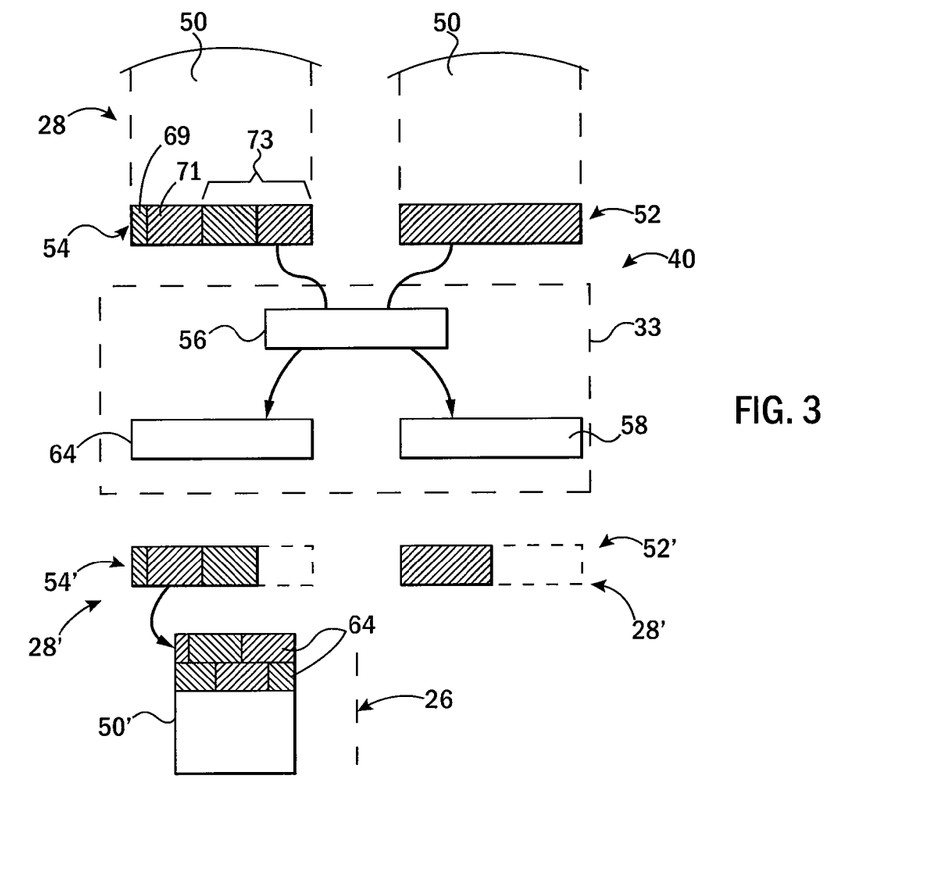
FIG. 3 is a data flow diagram of a compressor/decompressor during a compression operation.
Figure 6:
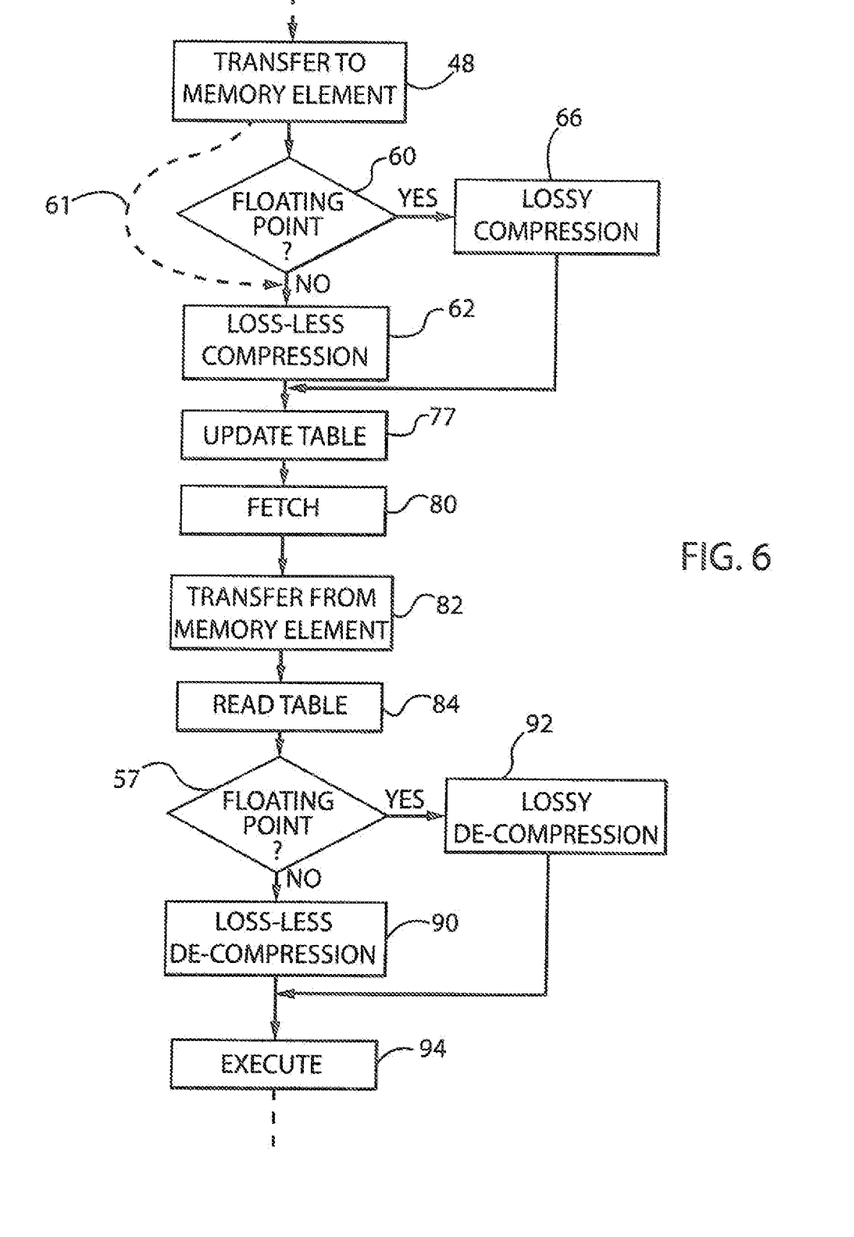
FIG. 6 is a flowchart showing the principal steps of the present invention.

Referring now to FIGS. 3 and 6, data 28 may be transferred among the memory elements 26 and computational units 22 in architecturally convenient blocks 50 of data 28, for example, each block including 128 bytes of data 28. The data 28 will generally be of different types including, for example, integer data 52 and floating-point data 54. Memory controller 40, upon receiving a command for the transfer of a block 50 of data 28 to a memory element 26 (as indicated by process block 48), may route the uncompressed data 28 of the uncompressed block 50 to the compressor/decompressor 33 where it is received by a data type identifier 56. The command in this context will typically be a block transfer instruction of a type known in the art indicating the data type.

As indicated by decision block 60 the data type identifier 56 may identify the data type to adopt a different compression or decompression scheme according to that type of data. In one embodiment, the data type identifier 56, when the data 28 is identified as integer data 52, communicates that data 28 to a loss-less compressor 58 as indicated by process block 62. The loss-less compressor 58 implements a loss-less compression scheme to reduce the number of bits in the data 28. For example, the loss-less compression system may be that described in Xi Chen, Yang L., R. P. Dick, Li Shang, and H. Lekatsas, "C-Pack: A High-Performance Microprocessor Cache Compression Algorithm," IEEE Transactions on Very Large Scale Integration (VLSI) Systems, Volume 18, Number Eight, Pages 196-1208 August 2010, hereby incorporated by reference. Importantly, the loss-less compression scheme not only produces compressed integer data 52' having fewer bits but allows the original integer data 52 to be fully restored by decompression without corruption or data loss.

Alternatively, when floating-point data 54 is identified, the data type identifier 56 may route the data to a lossy compressor 64 (as indicated by process block 66) that again reduces the number of bits in the resulting compressed floating-point data 54' but in a manner in which that removed data cannot be restored. One such lossy compression system may simply truncate bits from the original floating-point data 54. As is generally understood in the art, floating-point data 54 may include a sign bit 69 (indicating an algebraic sign of the data), an exponent portion 71 and a mantissa portion 73, the latter including most significant bits 74 and least significant bits 76. One lossy compression system may simply truncate the least significant bits 76 of the floating-point data 54 to produce a compressed floating-point data 54'. It will be understood that during decompression of this data, the truncated bits may be padded, for example, with zero or a midrange value.

Lossy compression can be rapid and provide a significant decrease in data size and may often be tolerated in floating-point data unlike with integer data where such compression may have a detrimental effect on accuracy or lead to erroneous execution states.

The present invention further contemplates that the lossy compression may be turned on or off, for example, by the programmer (for example, implemented through a memory data type extension header) to preserve accuracy when great accuracy is required or to accelerate processes, for example an initial solution search for large process space, that can be recognized in that programming time. When lossy compression is turned off, the identification of the data type per decision block 60 may be skipped as indicated by arrow 61. In this case, the data type identifier 56 may simply follow the instructions provided to it with respect to selecting among different types of data compression or no data compression.

Referring still to FIGS. 3 and 6, any compression, either using a lossy or loss-less compressors 64 or 58 will produce compressed data 28' and will have fewer bits than in the original byte that was compressed. These fractional bytes are then reassembled into contiguous chunks 64 (e.g. 16 byte chunks) that fill a portion of the 128 byte compressed block 50'. Even though only a portion of the compressed block 50' is filled, nevertheless a full 128 byte data block is reserved in the memory element 26 for storage of the compressed data block 50' for simplicity in addressing, the full data block preserving consistent address boundaries between blocks. This full allocation of full-sized data blocks 50 in memory elements 26 is acceptable because the compression of the present invention is not intended for memory conservation but rather to increase the effective bandwidth of data transfer.

Figure 4:
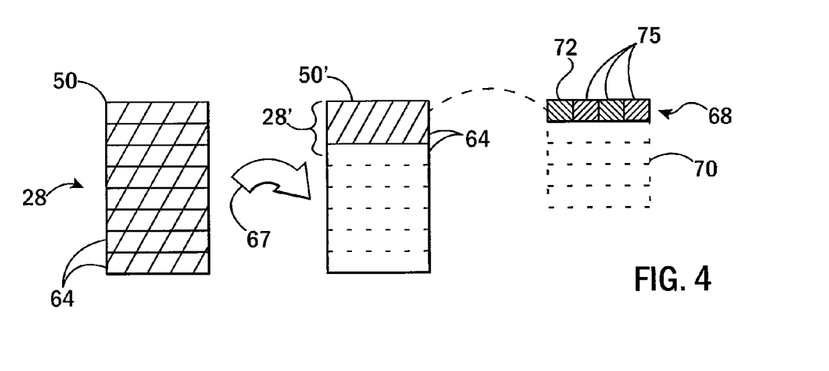
FIG. 4 is a pictorial representation of a data block undergoing compression as linked to data in a compression table indicating the degree of compression.

Referring now to FIG. 4, after a given data block 50 has been compressed, as indicated by process arrow 67, the amount of data (e.g., the number of significant chunks 64) in the data block 50 will be substantially decreased. In order to gain the benefit of this compression in reducing the transfer of data, only the significant chunks 64 should be transferred. For this purpose, the memory controller 40 must have access to information about the compression and amount of compression of each compressed data block 50' so as to transmit only the data 28 and not the empty addresses of the data block 50.

Accordingly, in one embodiment of the invention, each compressed data block 50' may be associated with an entry 68 in a compression lookup table 70. The entry 68 may provide a first bit 72 indicating whether a block 50 in memory element 26 has been compressed and a second set of bits 75 indicating the particular chunks 64 of the compressed data block 50' that hold significant data 28. For example, the second set of bits 75 may provide three bits allowing eight different 16 byte chunks 62 to be designated. Using this entry 68, the memory controller 40 only transfers the chunks 64 having active data. Upon each compression as indicated by process block 77 of FIG. 6, the compression lookup table 70 may be updated.

Figure 5:
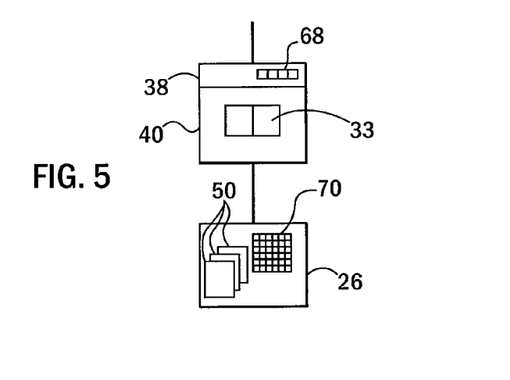
FIG. 5 is a detailed view of the memory controller and memory elements of FIG. 2 showing storage of the compression table of FIG. 4 and caching of portions of the compression table.

Referring now to FIG. 5, the compression lookup table 70 may require as much as, for example, 0.4 percent of the total GPU memory space to provide entries 68 for each compressed data block 50'. This data structure will generally be too large for practical storage in the cache 38 or other dedicated memory structure on a chip. Accordingly, in one embodiment of the invention, the compression lookup table 70 may be stored in the memory elements 26 associated with the particular compressed blocks 50' in that memory element 26. Portions of this compression lookup table 70 then may be cached in the cache 38 for rapid access by the memory controller 40 during the transfer process.

Figure 7:
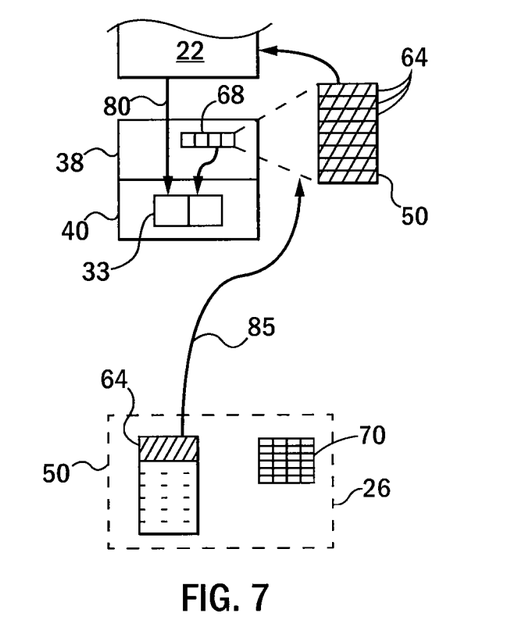
FIG. 7 is a data flow diagram showing a typical memory transfer operation from a memory element through the memory controller using cached information from the compression table.

Referring now to FIGS. 6 and 7, after the data 28 from the CPU system 12 is compressed and stored in a memory element 26, a computational unit 22 may make a fetch request 80 as indicated by like numbered process block 80 and arrow 80. Per the subsequent process block 82, the memory controller 40 may then initiate a transfer of the indicated block or blocks 50 from the memory element 26, first decompressing the data in the memory element 26 into decompressed block 50 and then forwarding it to the requesting computational unit 22.

Specifically, upon receiving the fetch request 80, the memory controller 40 accesses the compression lookup table 70 as indicated by process block 84 to determine whether the requested data block(s) 50 are compressed and where the compressed data 28 resides within each data block 50. Assuming the entry 68 of the compression lookup table 70 needed for the requested data block(s) 50 is cached in cache 38, this entry 68 is returned to the memory controller 40 which then transfers only the significant data from the compressed data block 50' as indicated by arrow 85 and decompresses that data, typically into cache 38 as a full uncompressed data block 50 with each chunk 64 fully reconstructed with significant data.

Figure 8:
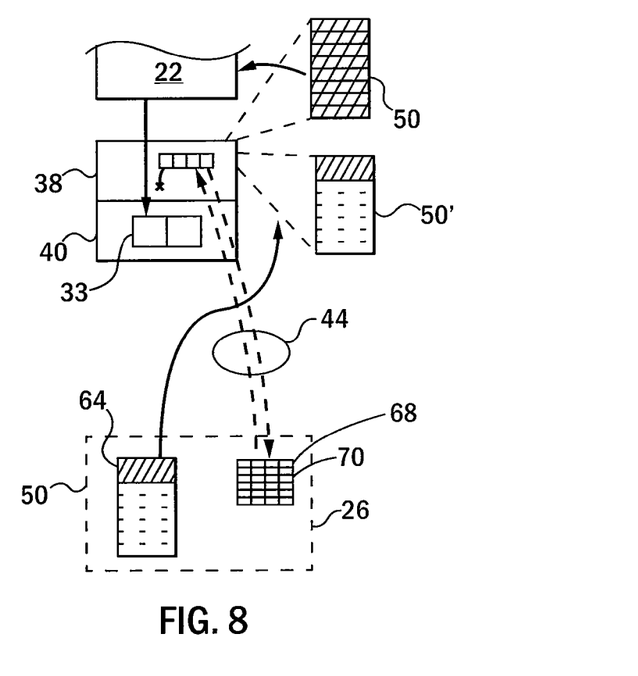
FIG. 8 is a figure similar to FIG. 7 showing the memory transfer operation in the event of a cache miss.

Referring now to FIG. 8, in some cases, the cache 38 will not have the necessary entry 68 of the compression lookup table 70 needed for transfer of the requested compressed data block 50'. In this case, a cache miss will occur and the necessary data from the compression lookup table 70 stored in memory element 26 will need to be transferred to the cache 38 through the virtual memory channel 44 described above. This high priority virtual memory channel 44 prevents a deadlock situation in which the necessary cache data (entry 68) gets blocked behind stalled data responses for cash blocks 50' that are waiting for the entry 68.

While the entry 68 is being transferred from the lookup table 70 stored in the memory element 26 to the cache 38, the memory controller 40 may transfer the entire data compressed block 50' including both populated data chunks 62 and those that are blank for reasons of the compression. This preemptive transfer prevents the stalling of the transfer process in these cases of a cache miss of data from the compression lookup table 70. Decompression of the compressed data block 50' as transferred to cache 38 may then be performed to produce a decompressed data block 50 after the necessary entry 68 of the lookup table 70 has been received in this decompressed data block 50 provided to the computational unit 22.

Referring again to FIG. 6, during the decompression process, once the entry 68 of the compression lookup table 70 has been obtained as indicated by process block 57, the data type identifier 56, as described above, may determine whether the particular data is floating-point data or integer data and may conduct a loss-less decompression as indicated by process block 94 or a lossy decompression process indicated by process block 92 as may be required based on this determination and the implicit previous compression of the data. In either case, the data is then passed to the computational unit 22 for execution as indicated by process block 94.

Upon completion of that execution of the data of the data block 50 by the computational unit 22, the data block 50 may be returned to the memory elements 26 by repeating the steps following process block 48 described above to recompress the data of the data block 50 for storage in the memory element 26.

Figure 9:
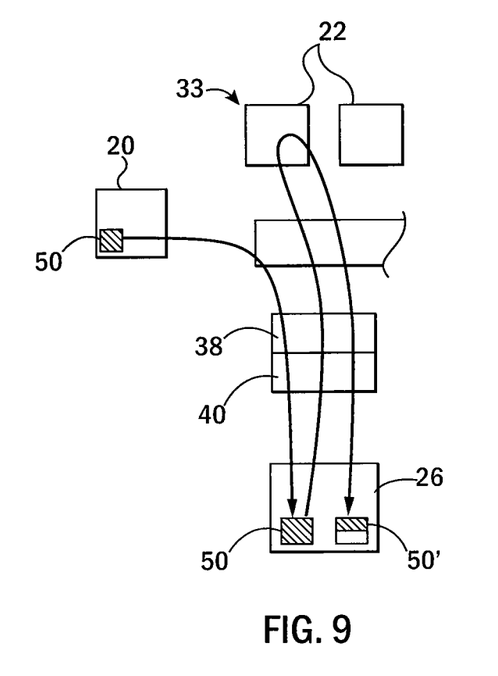
FIG. 9 is a fragmentary representation of the elements of FIG. 2 showing use of a computational element instead of the memory controller for the compression and decompression operation during first stage of compression.

Referring now to FIG. 9, in a second embodiment, the compressor/decompressors 33 may be implemented by one or more of the processing units 22 either dedicated to that purpose or switched in on a context-switching basis, instead of through dedicated circuitry in the memory controller 40. This latter approach uses additional computational resources but eliminates the need for specialized hardware allowing the present invention to be implemented without significant hardware modifications. In an example memory transfer operation using this technique, a data block 50 from memory 20 may be transferred (for example by direct memory access) to memory element 26 in an uncompressed form indicated by data block 50. This data may then be transferred via the memory controller 40 and the cache 38 to one computational unit 22 serving as the compressor/decompressor 33 which may compress the data and write it back via the cache 38 to the memory element 26 as a compressed data block 50'. The computational unit 22 serving as the compressor/decompressor 33 may also calculate and save the necessary data for the compression lookup table 70 (not shown in FIG. 9).

Figure 10:
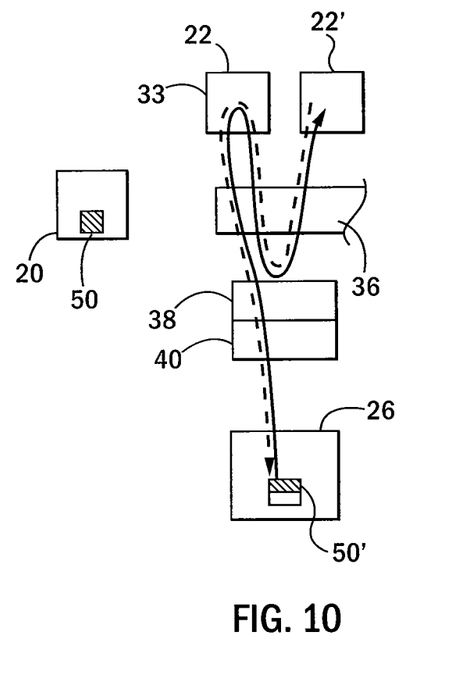
FIG. 10 is a figure similar to FIG. 9 showing compression and decompression of the compressed data in a transfer from a memory element to a processing element.

Referring now to FIG. 10, when the compressed data block 50, is required for use by a computational unit 22', it may be routed through the memory controller 40 and cache 38 to the computational unit 22 serving as the compressor/decompressor 33. This latter computational unit 22 may be the same computational unit 22 that originally compressed the compressed data block 50' or may be any computational unit 22 that is available based on context switching. The computational unit 22 providing the compressor/decompressor 33 then decompresses the compressed data block 50' into cache 38 and then routes this decompressed data to the computational unit 22' issuing the fetch request.

This process may be reversed as indicated by the dotted arrows in FIG. 10 after the execution on the uncompressed data block 50 is complete and the data of the data block 50 returned to the memory element 26 as compressed data block 50'. In this way the computational unit 22 that would otherwise be idle at certain times can be used to handle the compression and decompression overhead.

While the present invention has been described with respect to a system in which there is a separate memory 20 for the CPU system 12 and memory elements 26 for the GPU system 14, it will be appreciated, that it will also be applicable to systems that integrate memories between the CPU system 12 and GPU system 14. Although such integrated systems will not require data transfer between them, the performance impact of limited bandwidth of memory channels 24 will be worse (and thus the improvement provided by the present invention greater) since both the CPU and the GPU share common memory channels 24.

It will be appreciated, that the present invention may also compress the data footprint of the compressed data in the memory if the additional latency required for determining actual memory addresses of compressed data may be accommodated. It will further be understood that although the memory elements are typically off chip, they may include on-chip elements and further that the compression table may be stored partially or fully on-chip, for example, in dedicated memory other than the cache memory. Loss-less and lossy compression may be used exclusively as well as in combination as described herein.

While the present invention has been described with respect to a graphic processing unit (GPU) it will be appreciated that the purpose of the unit for graphics does not limit the invention and in fact that devices sold as graphic processing units can be and are used for scientific and mathematical calculations unrelated to graphics. The invention is therefore generally applicable to "accelerator processing units" are intended to be used with a master CPU including but not limited to graphic processing units.

Certain terminology is used herein for purposes of reference only, and thus is not intended to be limiting. For example, terms such as "upper", "lower", "above", and "below" refer to directions in the drawings to which reference is made. Terms such as "front", "back", "rear", "bottom" and "side", describe the orientation of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first", "second" and other such numerical terms referring to structures do not imply a sequence or order unless clearly indicated by the context.

When introducing elements or features of the present disclosure and the exemplary embodiments, the articles "a", "an", "the" and "said" are intended to mean that there are one or more of such elements or features. The terms "comprising", "including" and "having" are intended to be inclusive and mean that there may be additional elements or features other than those specifically noted. It is further to be understood that the method steps, processes, and operations described herein are not to be construed as necessarily requiring their performance in the particular order discussed or illustrated, unless specifically identified as an order of performance. It is also to be understood that additional or alternative steps may be employed.

References to "a microprocessor" and "a processor" or "the microprocessor" and "the processor," can be understood to include one or more microprocessors that can communicate in a stand-alone and/or a distributed environment(s), and can thus be configured to communicate via wired or wireless communications with other processors, where such one or more processor can be configured to operate on one or more processor-controlled devices that can be similar or different devices. Furthermore, references to memory, unless otherwise specified, can include one or more processor-readable and accessible memory elements and/or components that can be internal to the processor-controlled device, external to the processor-controlled device, and can be accessed via a wired or wireless network.

It is specifically intended that the present invention not be limited to the embodiments and illustrations contained herein and the claims should be understood to include modified forms of those embodiments including portions of the embodiments and combinations of elements of different embodiments as come within the scope of the following claims. All of the publications described herein, including patents and non-patent publications are hereby incorporated herein by reference in their entireties.

What I claim is:

1. An accelerator processing unit comprising:
  a plurality of computational elements each adapted to execute instructions on input data to provide output data;
  a plurality of memory elements storing compressed data and inter-communicating with a first set of the computational elements through associated memory channels to provide input data thereto and receive output data therefrom wherein the memory elements include blocks storing input data and output data;
  a compressor/decompressor associated with each memory channel between a memory element and a connected computational element to decompress the compressed data stored in the memory element for reading by the computational element and to compress data written by the computational element for storage in the memory element as the compressed data;
  a compression table storing for each block, compression data providing an indication of whether the data of the block is compressed and an amount of compression;
  wherein the compressor/decompressor uses the compression data to determine an amount of data to read from the block being different from a size of the block;
  further including at least one memory cache associated with each memory channel for caching a compression table; and
  wherein the compressor/decompressor uses compression data from the cache and, in an event of a cache miss of compression data for a given block, reads an entire given block while waiting for the cache miss to be resolved.

2. The accelerator processing unit of claim 1 wherein the compressor/decompressor is further adapted to provide at least two modes of compression and wherein the compressor/decompressor operates to selective the compression mode according to a compression mode signal.

3. The accelerator processing unit of claim 2 wherein the compression mode signal is derived from a data type of the data received by the compressor/decompressor.

4. The accelerator processing unit of claim 3 wherein the compression mode signal is derived from a data type provided in a memory transfer instruction.

5. The accelerator processing unit of claim 3 wherein the data type may include integer data, and single-/double-precision floating-point data and wherein the compressor/decompressor provides loss-less compression of integer data and lossy compression the floating-point data.

6. The accelerator processing unit of claim 5 wherein the lossy compression truncates bits from data transferred from the computational element to the memory element.

7. The accelerator processing unit of claim 6 wherein the compressor/decompressor truncates least significant bits of a mantissa of a floating point number.

8. The accelerator processing unit of claim 1 wherein the compressor/decompressor provides lossy compression.

9. The accelerator processing unit of claim 1 wherein the memory elements reserve blocks of memory having a predetermined address size for the compressed data based on the uncompressed size of the compressed data.

10. The accelerator processing unit of claim 1 wherein the compressor/decompressor is implemented with software algorithm executed by a second set of the computational elements different from the first set.

11. The accelerator processing unit of claim 1 wherein the memory elements are on a separate integrated circuit from an integrated circuit holding the computational units and the compressor/decompressor.

12. The accelerator processing unit of claim 1 wherein the compressor/decompressors include memory controllers for communicating with memory elements to translate between physical memory addresses and virtual memory addresses.

13. A computer system comprising:
  (a) an accelerator processing unit including:
    (i) a general-purpose computer including at least one processor communicating with a memory system;
  (b) a special purpose computer including:
    (i) a plurality of computational elements each performing instructions on input data to provide output data;
    (ii) a plurality of memory elements inter-communicating with a first set of the computational elements through associated memory channels to provide input data thereto and receive output data therefrom wherein the memory elements include blocks storing input data and output data;
    (iii) a compressor/decompressor associated with each memory channel between a memory element at a connected computational element to decompress data stored in the memory element for reading by the computational element and to compress data written by the computational element for storage in the memory element; and (iv) a compression table storing for each block, compression data providing an indication of whether the data of the block is compressed and an amount of compression;
wherein the compressor/decompressor operates to:
  receive data from the memory system and compress that data for storage in memory elements;
  receive compressed data from the memory elements and decompress the data for transfer to the computational elements using the compression data to determine an amount of data to read from the block being different from a size of the block;
  receive decompressed data from the computational elements and compress the data for storage in the memory elements;
  receive compressed data from the memory elements and decompress the data for transfer to the memory system;
further including at least one memory cache associated with each memory channel for caching a portion of the compression table; and
wherein the compressor/decompressor uses compression data from the cache and in an event of a cache miss of compression data for a given block, reads an entire given block while waiting for the cache miss to be resolved.

14. The computer system of claim 13 wherein the compressor/decompressor is adapted to provide a lossy compression and decompression and to provide a loss-less compression and decompression, and wherein the compressor/decompressor operates to selectively provide lossy or loss-less compression/decompression according to a data type of the data received by the compressor/decompressor.

15. A method of operating an accelerator processing unit comprising:
  a plurality of computational elements each adapted to execute instructions on input data to provide output data;
  a plurality of memory elements inter-communicating with a first set of the computational elements through associated memory channels to provide input data thereto and receive output data therefrom wherein the memory elements include blocks storing input data and output data;
  a compressor/decompressor associated with each memory channel between a memory element at a connected computational element to decompress data stored in the memory element for reading by the computational element and to compress data written by the computational element for storage in the memory element, and
  a compression table storing for each block, of compression data providing an indication of whether the data of the block is compressed and an amount of compression;
the method comprising the steps of:
  receive data over a memory channel from the computational elements and compress that data for storage in memory elements; and
  receive data over a memory channel from the memory elements and decompress the data for transfer to the computational elements using the compression data to determine an amount of data to read from the block being different from a size of the block,
wherein the accelerator processing unit further includes at least one memory cache associated with each memory channel for caching a portion of the compression table; and
wherein the compressor/decompressor uses compression data from the cache and, in an event of a cache miss of compression data for a given block, reads an entire given block while waiting for the cache miss to be resolved.

16. The method of claim 15 wherein the compression is selected between lossy compression and loss-less compression based on a type of the data.

17. The method of claim 15 wherein the compressor/decompressor is implemented with software algorithm executed by a second set of the computational elements different from the first set.

* * * * *